United States Patent
Sano et al.

(10) Patent No.: US 11,136,034 B2
(45) Date of Patent: Oct. 5, 2021

(54) TRAVEL CONTROL METHOD AND TRAVEL CONTROL DEVICE

(71) Applicant: Nissan Motor Co., Ltd., Yokohama (JP)

(72) Inventors: Yasuhito Sano, Kanagawa (JP); Hiroyuki Takano, Kanagawa (JP); Yuichi Takeda, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/623,151

(22) PCT Filed: Jun. 20, 2017

(86) PCT No.: PCT/JP2017/022744
§ 371 (c)(1),
(2) Date: Dec. 16, 2019

(87) PCT Pub. No.: WO2018/235171
PCT Pub. Date: Dec. 27, 2018

(65) Prior Publication Data
US 2020/0377100 A1    Dec. 3, 2020

(51) Int. Cl.
*B60W 30/18* (2012.01)
*B60W 30/10* (2006.01)
*G06K 9/00* (2006.01)
*B60W 50/00* (2006.01)

(52) U.S. Cl.
CPC ...... *B60W 30/18145* (2013.01); *B60W 30/10* (2013.01); *G06K 9/00798* (2013.01); *B60W 2050/0089* (2013.01); *B60W 2420/42* (2013.01); *B60W 2520/28* (2013.01)

(58) Field of Classification Search
CPC ........... B60W 30/18145; B60W 30/10; B60W 2520/28; B60W 2050/0089; B60W 2420/42; G06K 9/00798
See application file for complete search history.

(56) References Cited

U.S. PATENT DOCUMENTS

| | | | |
|---|---|---|---|
| 9,056,395 B1 * | 6/2015 | Ferguson | B60W 30/16 |
| 2013/0085637 A1 | 4/2013 | Grimm et al. | |
| 2014/0214322 A1 * | 7/2014 | Tsimhoni | G01C 21/34 |
| | | | 701/534 |
| 2015/0222813 A1 | 8/2015 | Okude et al. | |

(Continued)

FOREIGN PATENT DOCUMENTS

| | | |
|---|---|---|
| CN | 102933442 A | 2/2013 |
| JP | 2001-243457 A | 9/2001 |

(Continued)

*Primary Examiner* — Mussa A Shaawat
(74) *Attorney, Agent, or Firm* — Young Basile Hanlon & MacFarlane, P.C.

(57) ABSTRACT

A travel control method comprises: learning points which a vehicle has traveled over based on images of the surroundings of the vehicle captured with a camera mounted on the vehicle; learning the travel trajectory of the vehicle based on vehicle signals obtained from the vehicle; determining whether the vehicle has passed the points based on the images captured with the camera; and performing travel control of the vehicle by using the travel trajectory learned based on the vehicle signals as a target trajectory between the points.

8 Claims, 7 Drawing Sheets

(56) References Cited

U.S. PATENT DOCUMENTS

| | | | |
|---|---|---|---|
| 2016/0112624 A1* | 4/2016 | Kroekel | H04N 21/41422 348/148 |
| 2016/0162747 A1* | 6/2016 | Singh | G06K 9/00362 348/148 |
| 2016/0357188 A1* | 12/2016 | Ansari | G06K 9/00805 |
| 2017/0253237 A1* | 9/2017 | Diessner | B60W 30/06 |
| 2017/0287335 A1* | 10/2017 | Ansari | B60W 40/04 |
| 2017/0329331 A1* | 11/2017 | Gao | B60W 30/10 |
| 2018/0024564 A1* | 1/2018 | Matsuda | B60W 30/18145 701/25 |
| 2018/0032082 A1* | 2/2018 | Shalev-Shwartz | B60W 50/045 |
| 2018/0074493 A1* | 3/2018 | Prokhorov | G05D 1/0274 |
| 2018/0188060 A1* | 7/2018 | Wheeler | G06K 9/44 |
| 2018/0293464 A1* | 10/2018 | Martin | G06K 9/6218 |
| 2018/0374360 A1* | 12/2018 | Miao | G05D 1/0246 |
| 2019/0164007 A1* | 5/2019 | Liu | G06K 9/0063 |
| 2019/0236380 A1* | 8/2019 | Fukuhara | G05D 1/0251 |
| 2019/0286086 A1* | 9/2019 | Gardner | G05B 17/02 |
| 2020/0156533 A1* | 5/2020 | Lee | B60Q 1/085 |
| 2020/0333784 A1* | 10/2020 | Shashua | G05D 1/0088 |

FOREIGN PATENT DOCUMENTS

| | | |
|---|---|---|
| JP | 2008-174000 A | 7/2008 |
| JP | 2013-530867 A | 8/2013 |
| JP | 2014-106092 A | 6/2014 |
| WO | 2014/021421 A1 | 2/2014 |

\* cited by examiner

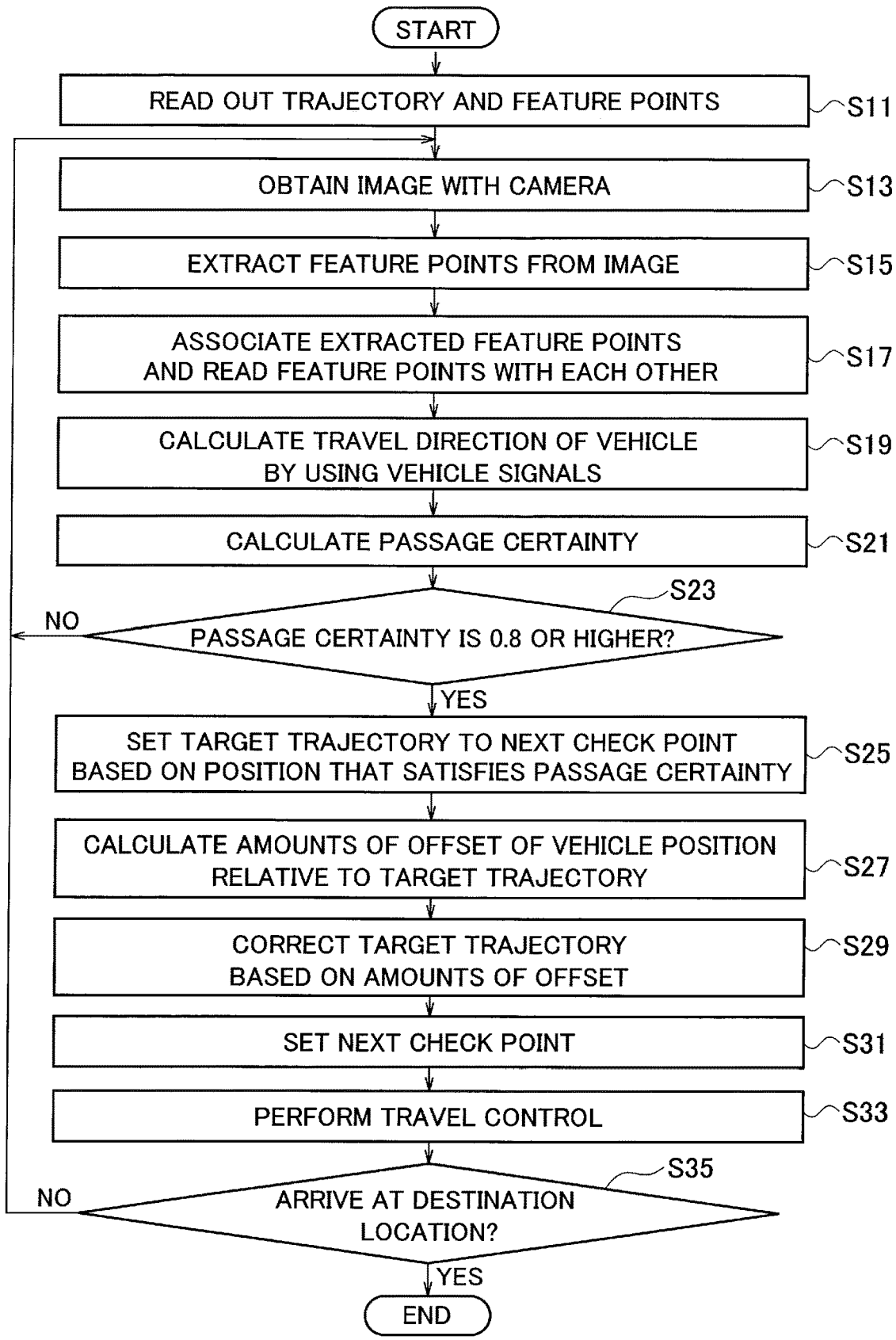

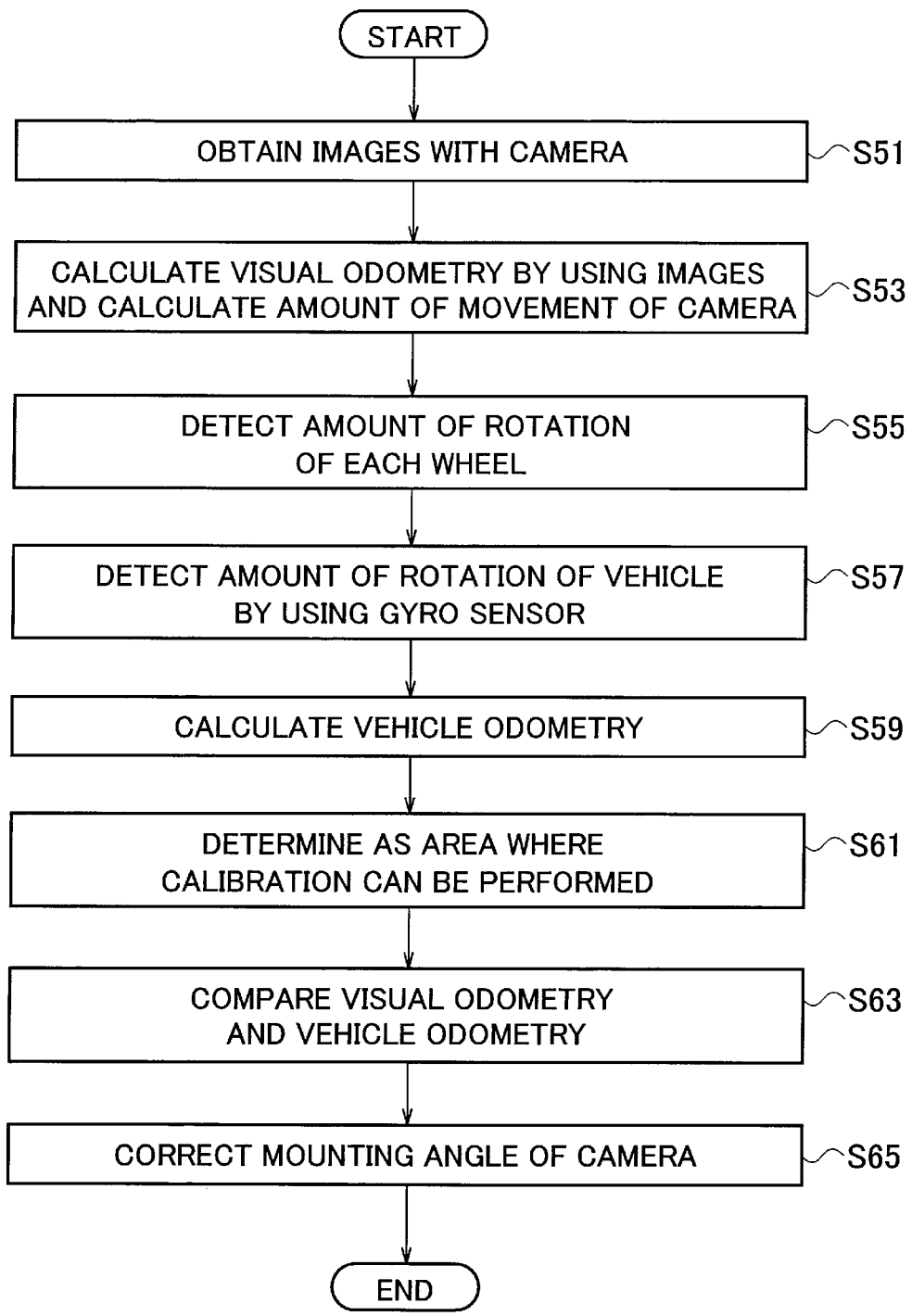

TRAVEL CONTROL METHOD AND TRAVEL CONTROL DEVICE

TECHNICAL FIELD

The present invention relates to a travel control method and a travel control device.

BACKGROUND

Heretofore, a three-dimensional position measurement device has been known which measures the three-dimensional position of an object based on the difference between the object's positions in images captured with a camera at different times and the amount of movement of the camera (see Japanese Patent Application Publication No. 2014-106092). In Japanese Patent Application Publication No. 2014-106092, among extracted feature points extracted from a processing target image, extracted feature points excluding those whose three-dimensional positions are determined are used to be checked against feature points extracted from the next processing target image to thereby suppress increase in processing time.

SUMMARY

By measuring the three-dimensional positions of surrounding objects (feature points) with a camera as described above, it is possible to create a map formed of the three-dimensional positions of the objects (feature points) and also identify points on the map which a vehicle has passed. Moreover, it is possible to make a travel plan to again pass points which the vehicle traveled over and perform vehicle travel control in accordance with the travel plan.

When the vehicle travel control is performed, the camera can be used to accurately check whether the vehicle has passed the points again. However, the detection accuracy of the amount of movement of the vehicle detected via visual odometry using the camera lowers as the distance from the vehicle to the feature points increases. This results in a large error between the amount of movement on the map and the real amount of movement. Hence, in the case where a vehicle travel plan is made using the amount of movement of the vehicle detected via visual odometry and vehicle travel control is performed in accordance with the travel plan, the vehicle may possibly fail to travel according to the real environment.

The present invention has been made in view of such a conventional problem, and an object thereof is to accurately travel according to the real environment.

A travel control method for a travel control device according to an aspect of the present invention comprises: learning points which a vehicle has traveled over based on images of the surroundings of the vehicle captured with a camera mounted on the vehicle; learning the travel trajectory of the vehicle based on vehicle signals obtained from the vehicle; determining whether the vehicle has passed the points based on the images captured with the camera; if the vehicle has passed any of the points, performing travel control of the vehicle by using the travel trajectory learned based on the vehicle signals as a target trajectory from any of the points to a next point; and determining whether the vehicle has passed the next point based on the images captured with the camera.

According to an aspect of the present invention, it is possible to accurately travel according to the real environment.

BRIEF DESCRIPTION OF THE DRAWINGS

FIG. 3 is a flowchart illustrating an example of the operation of a travel control unit 31;

FIG. 5 is a flowchart illustrating an example of the procedure of automatic calibration;

DETAILED DESCRIPTION

Next, an embodiment will be described in detail with reference to the drawings.

<Travel Control Device>

Figure 1:
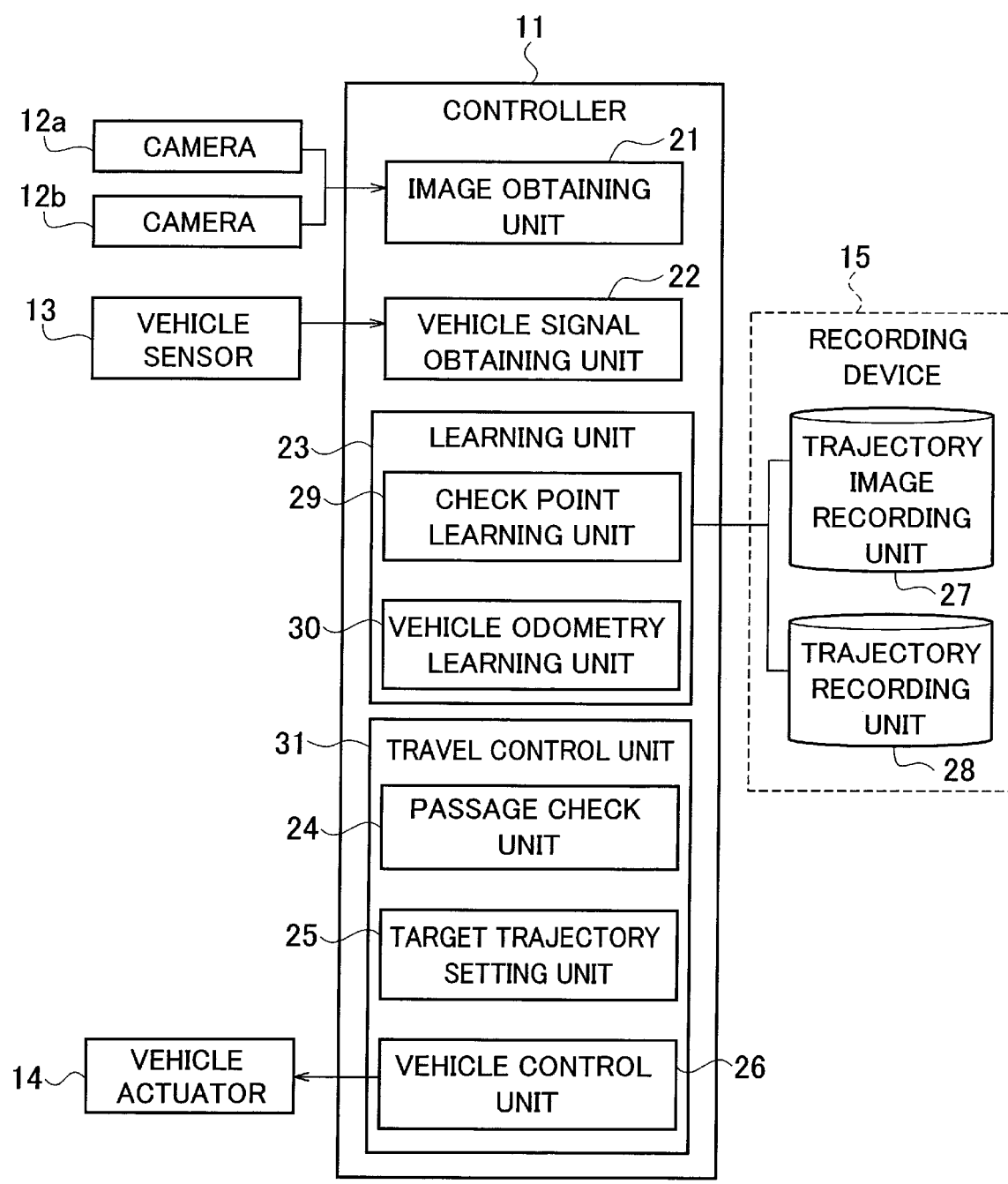
FIG. 1 is a functional block diagram illustrating the entire configuration of a travel control device according to an embodiment.

The entire configuration of a travel control device according to the embodiment will be described with reference to FIG. 1. The travel control device includes a camera (12a, 12b), a vehicle sensor 13, a recording device 15 that records data obtained from the camera (12a, 12b) and the vehicle sensor 13, a vehicle actuator 14 that executes vehicle travel control, and a controller 11.

The camera (12a, 12b) is a stereo camera mounted on the vehicle and generates image data by capturing images of the surroundings of the vehicle. The camera (12a, 12b) is capable of obtaining depth information on objects around the vehicle based on parallax information by capturing images of the objects simultaneously from a plurality of different directions. In other words, the three-dimensional positions of objects around the vehicle can be measured using the camera (12a, 12b). Distance information may of course be obtained from a single image captured with a monocular camera.

The vehicle sensor 13 is mounted on the vehicle and detects various pieces of information (vehicle signals) obtained from the vehicle. The vehicle sensor 13 includes, for example, a vehicle speed sensor that detects the travel speed of the vehicle (vehicle speed), a wheel speed sensor that detects the rotational speeds of the vehicle's wheels, a three-axis acceleration sensor (G sensor) that detects the accelerations (including decelerations) of the vehicle in three-axis directions, a steering angle sensor that detects the steering angle (including the turn angle), a gyro sensor that detects the angular speed of the vehicle, and a yaw rate sensor that detects the yaw rate.

The vehicle actuator 14 is a drive unit that executes operations of the accelerator, the brake, and the steering related to travel of the vehicle. The vehicle actuator 14 includes, for example, an accelerator pedal actuator that operates the accelerator pedal, a brake actuator that controls the braking force, and a steering actuator that controls the steering angle.

The controller 11 learns points and a travel trajectory which the vehicle has passed based on data obtained from the camera (12*a*, 12*b*) and the vehicle sensor 13, and performs vehicle travel control by controlling the vehicle actuator 14 based on the learning result. Note that the travel control executed in this embodiment only needs to be such that the vehicle is controlled to travel based on the learned travel trajectory and at least one of the acceleration pedal actuator, the brake actuator, and the steering actuator of the actuator 14 is controlled. Meanwhile, the travel control can be used in autonomous driving in which the vehicle is caused to travel without intervention of an occupant and in manual driving in which the vehicle is caused to travel based on intervention of an occupant. When used in the manual driving, the travel control assists the intervention of the occupant such that the vehicle can travel based on the travel trajectory.

The controller 11 is implementable by using a general-purpose microcomputer including a CPU (central processing unit), a memory, and an input-output unit. In the controller 11, a computer program (travel control program) for causing the controller 11 to function as a travel control device is installed, and the computer program is stored in the memory. By executing the computer program, the controller 11 functions as a plurality of information processing circuits (21, 22, 23, 31) included in the travel control device. Meanwhile, in the embodiment, an example will be presented in which the plurality of information processing circuits (21, 22, 23, 31) included in the travel control device are implemented by software. However, the information processing circuits (21, 22, 23, 31) can of course be configured by preparing dedicated hardware for executing the information processing operations to be presented later. Also, the plurality of information processing circuits (21, 22, 23, 31) may each be configured using an individual piece of hardware. Further, an electronic control unit (ECU) used for other vehicle control may be used also as the information processing circuits (21, 22, 23, 31).

The controller 11 includes an image obtaining unit 21, a vehicle signal obtaining unit 22, a learning unit 23, and a travel control unit 31 as the plurality of information processing circuits. The learning unit 23 includes a check point learning unit 29 and a vehicle odometry learning unit 30. The travel control unit 31 includes a passage check unit 24, a target trajectory setting unit 25, and a vehicle control unit 26.

The recording device 15 includes a trajectory image recording unit 27 and a trajectory recording unit 28 that store the results of learning by the learning unit 23. The trajectory image recording unit 27 records the result of learning by the check point learning unit 29, and the trajectory recording unit 28 records the result of learning by the vehicle odometry learning unit 30.

The image obtaining unit 21 obtains image data captured by the camera (12*a*, 12*b*). Specifically, the image obtaining unit 21 simultaneously obtains image data and a time stamp indicating the image capture timing thereof. The vehicle signal obtaining unit 22 obtains detection results from the vehicle sensor 13 as vehicle signals obtained from the vehicle. Specifically, the vehicle signal obtaining unit 22 simultaneously obtains vehicle signals and a time stamp indicating the detection timing thereof. By receiving the time stamps indicating the image capture timing and the detection timing along with the image data and the vehicle signals, it is possible to associate the image data and the vehicle signals with each other in terms of time axis.

The learning unit 23 (learning circuit) is capable of simultaneously learning points (check points) which the vehicle has traveled over and the travel trajectory in parallel.

The check point learning unit 29 calculates a map, the position of the vehicle on the map and the travel trajectory of the vehicle based on image data from the camera (12*a*, 12*b*). The calculation method is not particularly limited, and an existing method can be used. For example, firstly, feature points are extracted from an image from the camera (12*a*, 12*b*) and the three-dimensional positions of the feature points are identified based on a stereo matching process on the feature points and parallax information. Then, image capture is repeated while the vehicle travels, and a process of matching the feature points between frames (images) is performed. As a result, the travel trajectory of the vehicle can be calculated. By these matching processes, the check point learning unit 29 can indicate the three-dimensional positions of a plurality of feature points extracted from a plurality of frames on a single map (including an environment map). At the same time, the check point learning unit 29 can identify the position of the vehicle on the map and the travel trajectory of the vehicle. Note that the travel trajectory of the vehicle calculated based on images from the camera (12*a*, 12*b*) will be referred to as "visual odometry (VO)".

Further, the check point learning unit 29 learns points (check points) which the vehicle has traveled over based on image data from the camera (12*a*, 12*b*). Specifically, the check point learning unit 29 learns a check point based on an image captured when the vehicle passed the point. For example, the check point learning unit 29 may learn the check point based on the positions of feature points extracted from the image in the image or the three-dimensional positions of the feature points.

The result of the learning by the check point learning unit 29, including the map, the image data associated with the check points, and the position information on the feature points, is recorded in the trajectory image recording unit 27.

The vehicle odometry learning unit 30 calculates and learns the travel trajectory of the vehicle based on the vehicle signals detected by the vehicle sensor 13. The method of calculating the travel trajectory is not particularly limited, and an existing method can be used. For example, the yaw angle of the vehicle (including the attitude and the travel direction of the vehicle) may be calculated by calculating the yaw rate from the difference in rotational angle between right and left wheels and integrating the yaw rate. A yaw rate sensor may of course be used. Also, the amount of movement of the vehicle can be calculated from the amount of rotation of the vehicle's wheels. The travel trajectory of the vehicle calculated based on the vehicle signals will be referred to as "vehicle odometry". The result of the learning, including the travel trajectory of the vehicle, is recorded in the trajectory recording unit 28. Note that the vehicle odometry learning unit 30 may learn the travel trajectory divided at check points or learn the vehicle trajectory without dividing it. In the case of dividing the trajectory, the division method is not limited. The trajectory may be divided at intervals of a predetermined time or divided by scene (e.g., advancing straight, turning, freeway, local road, and intersection).

Note that the check point learning unit 29 and the vehicle odometry learning unit 30 are capable of learning check points and the travel trajectory (vehicle odometry) while the vehicle is traveling. Check points and the travel trajectory (vehicle odometry) may be learned simultaneously or one of them may be learned before the other.

Thus, the learning unit 23 is capable of learning check points and the travel trajectory (vehicle odometry) simultaneously in parallel.

The travel control unit 31 (travel control circuit) performs vehicle travel control based on the check points learned by the learning unit 23 and the travel trajectory between the check points. Specifically, the travel control unit 31 checks whether the vehicle has passed a check point again, and performs vehicle travel control by using the travel trajectory (vehicle odometry) learned based on the vehicle signals as the target trajectory between check points.

The travel control unit 31 makes a vehicle travel plan on the map created by the learning unit 29 based on an instruction from the user. The travel plan includes a start location (including the current location), a destination location, and check points to pass along a travel route from the start location to the destination location. The travel control unit 31 performs vehicle travel control in accordance with the travel plan.

The passage check unit 24 determines whether the vehicle has passed a check point. Specifically, the passage check unit 24 firstly reads out the image (recorded image) captured when the vehicle passed the check point and the position information on the feature points in the recorded image from the trajectory image recording unit 27. Then, the passage check unit 24 associates the feature points in an image (target image) captured in the travel control and the feature points in the recorded image with each other. If successfully associated feature points satisfy a predetermined condition, it can be determined that the position and attitude of the camera at the check point have been reproduced in the travel control. Specifically, it can be determined that the target image has been obtained with the same position and attitude of the camera as those at the time when the recorded image was obtained. Then, in this case, the passage check unit 24 determines that the vehicle has passed the check point.

The learning of a check point based on an image is to learn the position of the vehicle in association with feature points extracted from the surrounding environment of the vehicle. For this reason, the error between a check point on the map, which is the result of the learning, and the corresponding real check point is significantly small. Thus, a high degree of reproduction makes it possible to confirm passage through a check point in the travel control.

Note that whether successfully associated feature points satisfy a predetermined condition can be determined using the following method, for example. First, the number of feature points extracted from the recorded image is Fs. Among the feature points extracted from the target image, the number of feature points which are successfully associated with the feature points extracted from the recorded image is Fn. For example, if the shift of the position of a feature point relative to the vehicle between the recorded image and the target image is smaller than a predetermined value, that feature point is determined to be successfully associated. An image passage certainty (Z) is defined as Z=Fn/Fs. The image passage certainty indicates the possibility of the vehicle having passed a check point. If the image passage certainty is lower than 0.8, the image passage certainty is low, and the passage check unit 24 therefore determines that the successfully associated feature points do not satisfy a predetermined condition, that is, the vehicle has not passed the check point. If the image passage certainty is 0.8 or higher, the passage check unit 24 determines that the successfully associated feature points satisfy the predetermined condition, that is, the vehicle has passed the check point.

Note that the passage check unit 24 may additionally check the degree of reproduction of the vehicle's attitude at the check point from the travel trajectory (vehicle odometry) based on the vehicle signals. The passage check unit 24 reads out the travel trajectory (vehicle odometry) at the point when the vehicle passed the check point from the trajectory recording unit 28, and identifies the travel direction of the vehicle at the point when the vehicle passed the check point (learned travel direction). Then, the passage check unit 24 associates the travel direction of the vehicle detected in the travel control based on the image and the learned travel direction with each other. The passage check unit 24 may determine that the vehicle has passed the check point if the successfully associated feature points satisfy the predetermined condition and also the travel directions are successfully associated with each other. For example, if the difference in angle between the travel direction in the travel control and the learned travel direction is 5° or smaller, the passage check unit 24 may determine that the travel directions are successfully associated with each other.

Further, if the amount of offset of the camera calculated from the association between the feature points, i.e., the amount of shift from the check point, is a predetermined value (2 m) or greater, the image passage certainty is zero (Z=0). In this case, the passage check unit 24 may determine that the vehicle has not passed the check point. Alternatively, the passage check unit 24 may calculate the distance from the target trajectory set by the target trajectory setting unit 25 to the position of the vehicle, and determine that the vehicle has not passed the check point if the distance is a predetermined value (2 m) or longer.

The target trajectory setting unit 25 sets the travel trajectory (vehicle odometry) learned using the vehicle signals as the target trajectory between check points. Specifically, when the passage check unit 24 confirms passage through a first check point, the target trajectory setting unit 25 reads out the travel trajectory from the first check point to a second check point from the trajectory recording unit 28 and sets the read travel trajectory as the target trajectory to the second check point (next check point). The second check point is the check point to plan to be passed through after the first check point in the travel plan.

The target trajectory setting unit 25 calculates amounts of offset relative to the target trajectory based on the position and travel direction of the vehicle at the point when the passage check unit 24 confirmed the passage through the first check point. The target trajectory setting unit 25 calculates the amount of shift of the vehicle's position from the first check point at the point when the passage through the first check point was confirmed and the amount of shift of the vehicle's travel direction relative to the target trajectory at the point when the passage through the first check point was confirmed, as the amounts of offset relative to the target trajectory. The target trajectory setting unit 25 corrects the target trajectory based on the amounts of offset. Specifically, the target trajectory setting unit 25 corrects the target trajectory such that the amounts of shift of the vehicle's position and travel direction are corrected. Without correcting the target trajectory, the amounts of shift of the vehicle's position and travel direction at the point when the passage through the first check point was confirmed will continues to be present at the second check point as well. By correcting the target trajectory based on the amounts of offset, the vehicle can be caused to travel along the corrected target trajectory. Hence, the vehicle can be caused to travel toward the next check point (second check point). Accordingly, the likelihood of the vehicle passing the next check point (second check point) can be raised.

The vehicle control unit 26 controls the vehicle actuator 14 such that the vehicle travels the same trajectory as the travel trajectory between the points set or corrected by the target trajectory setting unit 25. The control method is not limited to a specific method, and an existing method may be used. For example, the vehicle control unit 26 can control the vehicle actuator 14 by using control (e.g., PID control) which feeds back a travel trajectory computed from the vehicle signals in the travel control.

<Travel Control Method>

Figure 2:
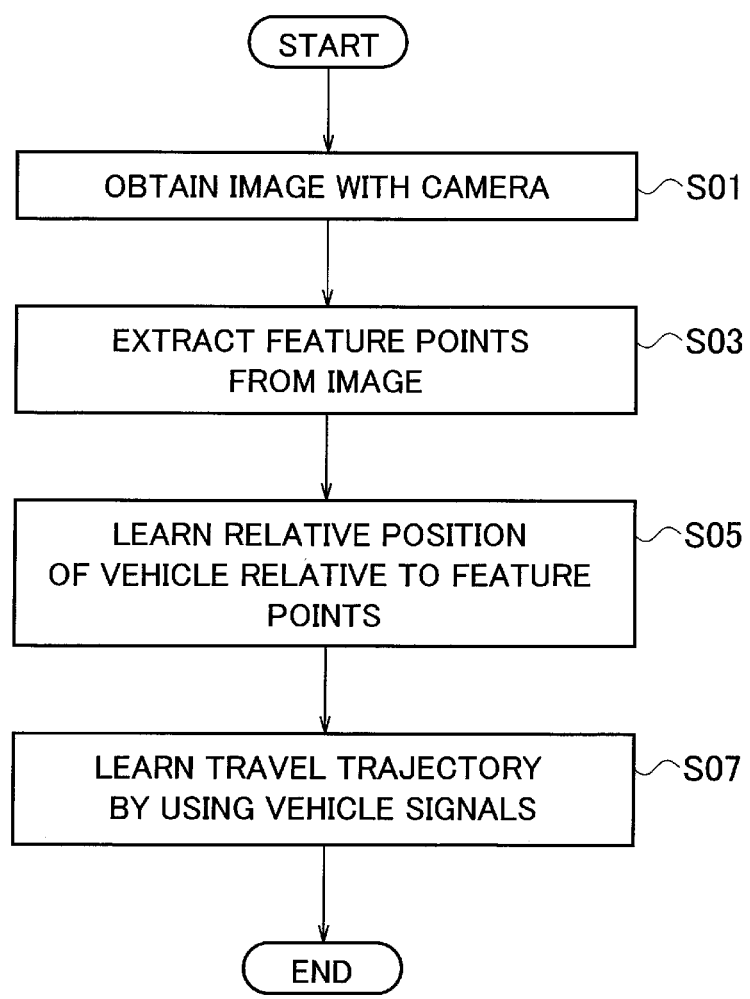
FIG. 2 is a flowchart illustrating an example of the operation of a learning unit 23.

Next, an example of the operation of the travel control device will be described with reference to FIGS. 2 and 3. An example of the operation of the learning unit 23 will be described first with reference to FIG. 2.

In step S01, the image obtaining unit 21 captures an image of the surroundings of the vehicle with the camera (12a, 12b) and obtains the image. The image obtaining unit 21 synchronizes the image capture timings of the camera (12a, 12b) with each other and repetitively captures an image at a predetermined frame rate (1 to 5 FPS).

Proceeding to step S03, the check point learning unit 29 extracts feature points from the image captured by the camera (12a, 12b).

Proceeding to step S05, the check point learning unit 29 identifies the three-dimensional positions of the feature points based on a stereo matching process on the feature points and parallax information on the image. Then, the check point learning unit 29 learns the relative position of the vehicle relative to the feature points as a point which the vehicle has traveled over (check point). The check point learning unit 29 records the result of the learning, including the image data associated with the check point and the position information on the feature points, in the trajectory image recording unit 27. In this operation example, a process of matching the feature points between frames (images) does not have to be performed. In other words, a map indicating the three-dimensional positions of a plurality of feature points extracted from a plurality of frames does not have to be created.

Proceeding to S07, the vehicle odometry learning unit 30 calculates and learns the travel trajectory of the vehicle based on the vehicle signals detected by the vehicle sensor 13. The vehicle odometry learning unit 30 records the result of the learning, including the travel trajectory of the vehicle, in the trajectory recording unit 28. Note that the operation is not limited to this example, and steps S01 to S05 and step S07 may be executed simultaneously, or step S07 may be executed before steps S01 to S05.

Next, an example of the operation of the travel control unit 31 will be described with reference to FIG. 3. In step S11, the passage check unit 24 reads out the image (recorded image) captured when the vehicle passed a check point and the position information on the feature points in the recorded images from the trajectory image recording unit 27.

Proceeding to step S13, the image obtaining unit 21 captures an image of the surroundings of the vehicle with the camera (12a, 12b) and obtains the image. The image obtaining unit 21 synchronizes the image capture timings of the camera (12a, 12b) with each other and repetitively captures an image at a predetermined frame rate (1 to 5 FPS).

Proceeding to step S15, the passage check unit 24 extracts feature points in the image (target image) obtained in step S13. Proceeding to step S17, the passage check unit 24 associates the feature points extracted in step S15 and the feature points in the read recorded image.

Proceeding to step S19, the passage check unit 24 calculates the travel direction of the vehicle via the vehicle odometry. Proceeding to step S21, the passage check unit 24 calculates the result of the association of the feature points as the image passage certainty (Z). Proceeding to step S23, the passage check unit 24 determines whether the image passage certainty (Z) is 0.8 or higher. Further, the passage check unit 24 compares the travel direction of the vehicle at the point when the vehicle passed the check point (learned travel direction) and the travel direction in the travel control calculated in step S19 with each other. The passage check unit 24 determines whether or not the difference in angle between the travel direction in the travel control and the learned travel direction is 5° or smaller.

If the image passage certainty (Z) is 0.8 or higher and the difference in angle is 5° or smaller (YES in S23), the passage check unit 24 determines that the vehicle has passed the check point, and proceeds to step S25. On the other hand, if the image passage certainty (Z) is lower than 0.8 or the difference in angle is larger than 5° (NO in S23), the passage check unit 24 determines that the vehicle has not passed the check point, and returns to step S13.

In step S25, the target trajectory setting unit 25 sets the travel trajectory (vehicle odometry) learned in step S07 as the target trajectory to the next check point from the position of the vehicle at the point when the passage through the check point was confirmed as a base position (YES in step S23).

Proceeding to step S27, the target trajectory setting unit 25 calculates the amounts of offset relative to the target trajectory from the position of the vehicle at the point when the passage through the check point was confirmed as a base position. Specifically, the target trajectory setting unit 25 calculates the amount of shift of the vehicle's position from the check point and the amount of shift of the vehicle's travel direction relative to the target trajectory. Proceeding to step S29, the target trajectory setting unit 25 corrects the target trajectory set in step S25 based on the amounts of offset such that the amounts of shifts of the vehicle's position and travel direction are corrected.

Proceeding to step S31, the passage check unit 24 sets the next check point. Specifically, the passage check unit 24 reads out the image (recorded image) captured at the point when the vehicle passed the next check point and the position information on the feature points in the recorded image from the trajectory image recording unit 27.

Proceeding to step S33, the vehicle control unit 26 controls the vehicle actuator 14 such that the vehicle travels the same trajectory as the travel trajectory corrected in step S29. Proceeding to step S35, the travel control unit 31 determines whether the vehicle has reached the destination location in the travel plan, and repetitively executes steps S11 to S33 until the vehicle reaches the destination location.

<Calibration>

Next, calibration of the camera (12a, 12b) with respect to its the mounting position and mounting angle will be described. There are errors in mounting position and mounting angle among individual cameras (12a, 12b). Also, the mounting position and angle of the camera (12a, 12b) may possibly change with the travel distance or travel time. The mounting position or mounting angle of the camera (12a, 12b) in a period in which the vehicle travel control is performed (online period) may possibly change from the mounting position or mounting angle in the period in which check points and the travel trajectory were learned (offline period).

Figure 4A:
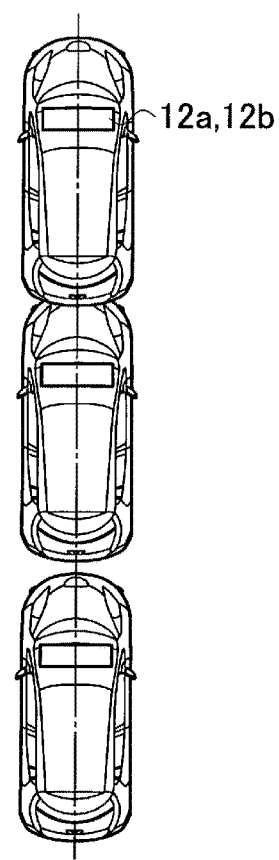
FIG. 4A is a diagram illustrating the attitude of a vehicle advancing straight when the mounting angle (yaw angle) of a camera (12a, 12b) is correct.
Figure 4B:
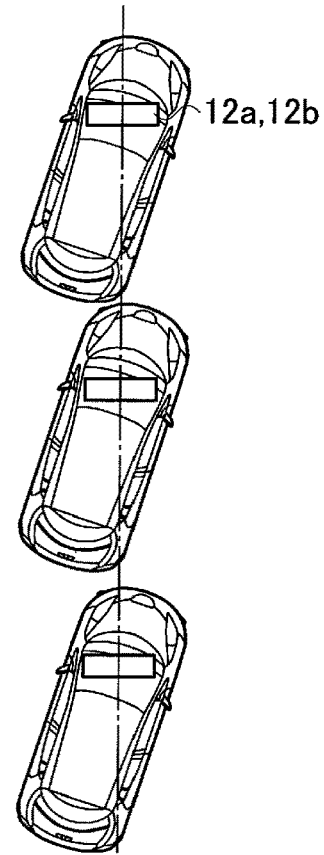
FIG. 4B is a diagram illustrating the attitude of the vehicle advancing straight when the mounting angle (yaw angle) of the camera (12a, 12b) is tilted.
Figure 4C:
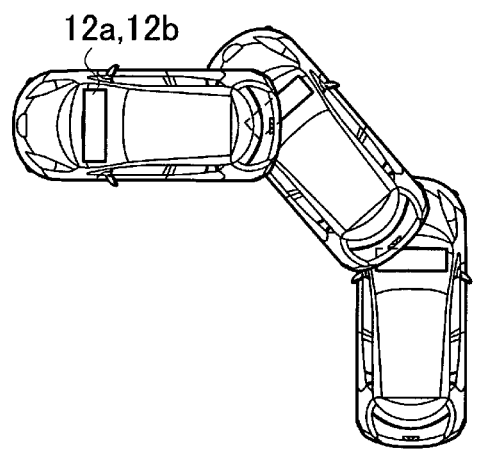
FIG. 4C is a diagram illustrating the trajectory of a turn of the vehicle when the mounting position of the camera (12a, 12b) in the vehicle front-rear direction is correct.
Figure 4D:
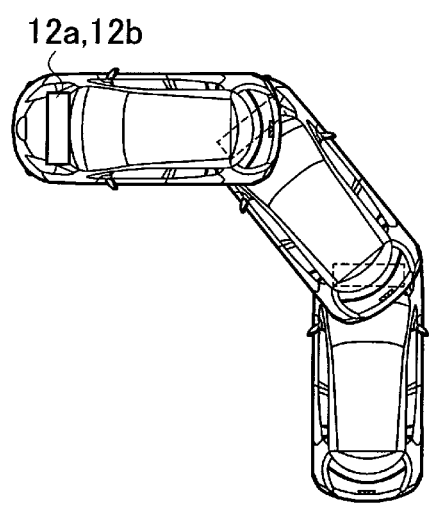
FIG. 4D is a diagram illustrating the trajectory of the turn of the vehicle when the mounting position of the camera (12a, 12b) in the vehicle front-rear direction is shifted.

If the mounting position or mounting angle of the camera (12a, 12b) is shifted, the amount of movement of the camera (12a, 12b) can be calculated correctly but the amount of movement of the vehicle cannot be calculated correctly. For example, even if the speed of the vehicle is the same, a difference in mounting angle (pitch angle) of the camera (12a, 12b) changes the speed of movement of feature points in images. This leads to an error in amount of movement of the vehicle. Besides this, while the attitude of the vehicle advancing straight can be calculated correctly when the mounting angle (yaw angle) of the camera (12a, 12b) is correct, as illustrated in FIG. 4A, the movement of the vehicle cannot be calculated correctly when the mounting angle is tilted, as illustrated in FIG. 4B. Also, as illustrated in FIGS. 4C and 4D, if the mounting position of the camera (12a, 12b) is shifted in the vehicle front-rear direction, the movement trajectory of the camera (12a, 12b) can be calculated correctly but the travel trajectory of the vehicle cannot be calculated correctly when the vehicle makes a turn.

In view of this, it is desirable to perform calibration (automatic calibration) the camera (12a, 12b) with respect to its mounting position or mounting angle during travel. An example of the procedure of the automatic calibration will be described with reference to FIG. 5.

Firstly, in step S51, the image obtaining unit 21 captures images of the surroundings of the vehicle with the camera (12a, 12b) and obtains the images. Proceeding to step S53, the check point learning unit 29 identifies the three-dimensional positions of feature points based on a stereo matching process on the feature points and parallax information. Then, the check point learning unit 29 performs a process of matching the feature points between frames (images) to calculate the travel trajectory (visual odometry) of the vehicle. The check point learning unit 29 calculates the amount of movement of the camera (12a, 12b) from the visual odometry.

Proceeding to step S55, the wheel speed sensor detects the rotational speed of each wheel, and the vehicle odometry learning unit 30 detects the amount of rotation of each wheel by integrating the rotational speed by time. Proceeding to S57, the vehicle odometry learning unit 30 detects the amount of rotation of the vehicle (yaw angle) by using the gyro sensor. Proceeding to step S59, the vehicle odometry learning unit 30 calculates the travel trajectory (vehicle odometry) of the vehicle based on the amount of rotation of each wheel and the amount of rotation of the vehicle (yaw angle).

Proceeding to step S61, the controller 11 determines whether the vehicle is traveling an area where calibration can be performed. Specifically, the controller 11 checks whether the area in which the vehicle is traveling is an area where a necessary number of feature points for calculating visual odometry can be obtained. If the vehicle is traveling an area where the change in image luminance is small or an area where the amount of light is small, the controller 11 determines that the area in which the vehicle is traveling is not an area where calibration can be performed, and stops the processing for calibration.

Note that visual odometry involves estimating the travel direction of the camera (12a, 12b) while tracking a plurality of feature points by means of a process of matching feature points between frames. For this reason, it is possible to continue measuring the travel direction by using a plurality of feature points even in an area where distant objects are invisible, an area where feature points are flashing points, and an area where the vehicle cannot travel straight such as a winding road.

If the area in which the vehicle is traveling is determined to be an area where calibration can be performed, the controller 11 proceeds to step S63, in which it compares the travel trajectory of the vehicle calculated in step S53 (first movement value: visual odometry) and the travel trajectory of the vehicle calculated in step S59 (second movement value: vehicle odometry) with each other to calculate the difference between the travel trajectories as the result of the comparison. Proceeding to step S65, the controller 11 corrects output values from the camera (12a, 12b) based on the difference between the travel trajectories. The output values from the camera (12a, 12b) include the positions of the feature points in an image outputted from the camera (12a, 12b). Specifically, the controller 11 calculates the shifts of the mounting position and mounting angle (yaw angle, pitch angle) of the camera (12a, 12b) based on the result of the comparison between the visual odometry and the vehicle odometry. The controller 11 then corrects the positions of the feature points in the image such that these shifts are corrected. In this way, the camera (12a, 12b) can be calibrated during travel and the mounting position and mounting angle of the camera (12a, 12b) can be accurately identified.

Note that an output value in the travel direction of the vehicle and an output value in a direction perpendicular to the travel direction may be corrected as the output values from the camera (12a, 12b). In this way, in the case where there is an error in the direction parallel to the travel direction of the vehicle, it is possible to accurately correct the output value in the perpendicular direction.

Also, the output values from the camera (12a, 12b) may be corrected while the vehicle is advancing straight. In other words, the processing may be advanced after confirming in step S61 in FIG. 5 that the vehicle is advancing straight. Specifically, the camera (12a, 12b) is calibrated with respect to its the mounting angle (yaw angle) by using the fact that "the vehicle is facing forward while advancing straight". When the vehicle is advancing straight, feature points in images exhibit a constant motion. It is therefore possible to stably detect the feature points without losing them. Thus, use of visual odometry makes it possible to accurately determine whether the vehicle is advancing straight. Even when the vehicle is slaloming, a local zone where vehicles advance straight may be extracted and calibration may be executed therein. In this way, the system operation time can be increased.

As described above, according to the embodiment, the following advantageous effects can be achieved.

In the travel control device according to the embodiment, a map formed of the three-dimensional positions of objects around a vehicle is created and, at the same time, points (check points) on the map which the vehicle has passed and the travel trajectory (vehicle odometry) are learned, and vehicle travel control is performed such that the vehicle again passes the learned check points and travels along the learned travel trajectory (vehicle odometry).

In the embodiment, the travel trajectory (vehicle odometry) of the vehicle is learned based on the vehicle signals obtained from the vehicle. The accuracy of the amount of local movement learned via vehicle odometry is higher than the accuracy of the amount of local movement learned via visual odometry. In particular, the accuracy of the amount of local movement learned based on images in which the distance to feature points is long is significantly low. To address this, check points are learned using the camera (12a, 12b), and the travel trajectory is learned via vehicle odometry. In this way, it is possible to reduce the error between the travel trajectory (vehicle odometry) between the learned points and the real travel trajectory and therefore execute accurate travel control according to the real environment.

Also, the travel control device according to the embodiment creates a map formed of the three-dimensional positions of objects around the vehicle and, at the same time, learns points (check points) on the map which the vehicle has passed and the travel trajectory (vehicle odometry) between the passed check points, and performs vehicle travel control such that the vehicle again passes the learned check points and travels along the learned travel trajectory (vehicle odometry).

Thus, the travel trajectory learned via the vehicle odometry, which is accurate, can be used as the target trajectory between the check points when travel control is performed. In this way, the vehicle does not greatly depart from the real travel trajectory, so that no major corrective steering will be performed. The vehicle can therefore be caused to travel along a travel trajectory with a high degree of reproduction.

The learning of a point (check point) based on an image is to learn the position of the vehicle in association with feature points extracted from the surrounding environment. For this reason, the error between a point on the map, which is the result of the learning, and the corresponding real point is significantly small. Thus, the error of the travel trajectory between check points can be corrected by checking passage through a check point. However, the longer the distance to the feature points, the lower the accuracy of the amount of movement of the vehicle learned via visual odometry. Then, in the case where the travel trajectory is learned via visual odometry, the error contained in the travel trajectory is large. Consequently, a large positional shift will be found at a point (check point) and major corrective steering will be performed after that.

Figure 6A:
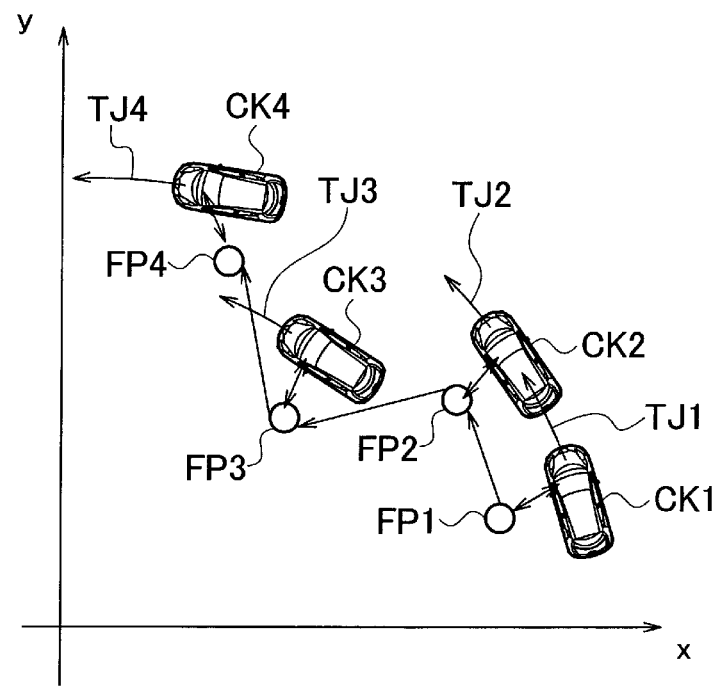
FIG. 6A is a diagram illustrating the relative positions of check points (CK1 to CK4) relative to feature points (FP1 to FP4), the relative positions of the feature points (FP1 to FP4) relative to each other, and a target trajectory (vehicle odometry: TJ1 to TJ4) from each check point (CK1 to CK4) on a map which are learned via visual odometry.
Figure 6B:
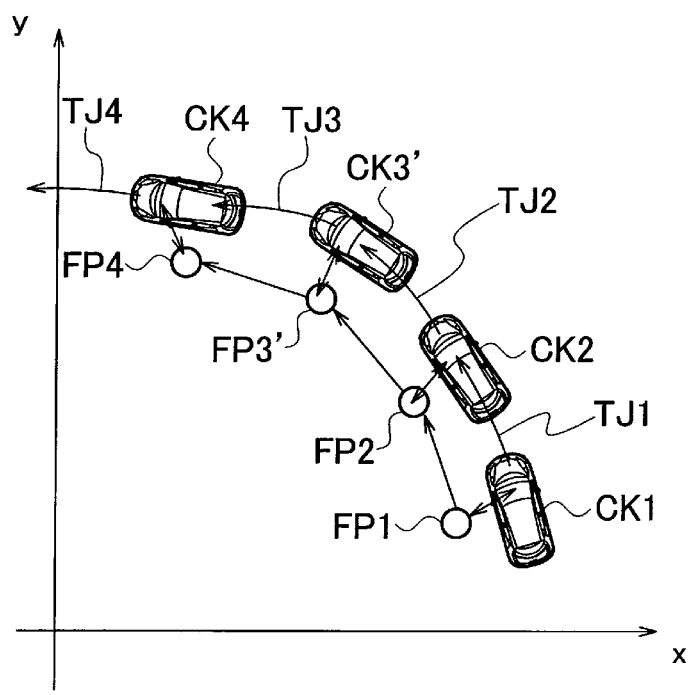
FIG. 6B is a diagram illustrating actual movement of the vehicle, and illustrates the relative positions of check points (CK1 to CK4) relative to feature points (FP1 to FP4), the relative positions of the feature points (FP1 to FP4) relative to each other, and a target trajectory (vehicle odometry: TJ1 to TJ4) from each check point (CK1 to CK4).

As illustrated in FIGS. 6A and 6B, by setting vehicle positions at short distances from feature points (FP1 to FP4) as check points (CK1 to CK4), respectively, it is possible to accurately determine passage through the check points (CK1 to CK4). On the other hand, travel trajectories learned via vehicle odometry, which is accurate, are used as the target trajectories (TJ1 to TJ4) between the check points (CK1 to CK4).

According to this embodiment, travel trajectories learned via vehicle odometry, which is accurate, can be used as the target trajectories between check points. In this way, no major corrective steering will be performed, and the vehicle can be caused to travel along a travel trajectory with a high degree of reproduction. It is therefore possible to execute accurate travel control according to the real environment.

As illustrated in FIG. 6A, the relative positions of the check points (CK1 to CK4) relative to the feature points (FP1 to FP4) on a map learned via visual odometry can be accurately calculated by visual odometry. However, the relative positions of the feature points (FP1 to FP4) relative to each other are not accurate. For this reason, on the map learned via visual odometry, the target trajectories (TJ1 to TJ4) between the check points (CK1 to CK4) are discontinuous from one another, as illustrated in FIG. 6A. Here, as illustrated in FIG. 6B, the target trajectories (TJ1 to TJ4) between the check points (CK1 to CK4) are actually a continuous trajectory, and trajectories which the vehicle traveled once can be accurately reproduced. In other words, it is possible to perform vehicle travel control such that the vehicle again passes the learned check points (CK1 to CK4) and travels along the learned travel trajectories (TJ1 to TJ4). In contrast, if target trajectories (not illustrated) are set between the check points (CK1 to CK4) so as to define a single continuous trajectory on the map illustrated in FIG. 6A, the vehicle will greatly depart from the actual travel trajectory. Consequently, a large positional shift will be found at one of the check points (CK1 to CK4) and major corrective steering will be performed after that.

When check points are learned, the travel trajectory of the vehicle between the check points can also be learned based on the vehicle signals obtained from the vehicle. In other words, the travel trajectories divided at each check point may be learned. Alternatively, travel trajectories divided at intervals of a predetermined time or by scene (e.g., advancing straight, turning, freeway, local road, and intersection) may be learned. This makes it possible to locally learn accurate travel trajectories.

When determining that the vehicle has passed a check point, the controller 11 sets the travel trajectory (vehicle odometry) from the check point to the next check point as the target trajectory, and corrects the target trajectory by using the position and travel direction of the vehicle at the point when the controller 11 determined that the vehicle passed the check point. If determining that the vehicle has not passed the check point, the controller 11 prohibits the correction of the set target trajectory. In this way, it is possible to prevent correction of the target trajectory from a vehicle position that is not a base position.

The controller 11 calculates the distance from the target trajectory to the position of the vehicle, and determines that the vehicle has not passed the check point if the distance is a predetermined value or longer. When the distance from the target trajectory to the position of the vehicle is the predetermined value or longer, the image passage certainty (Z) is likely to be low. In other words, the vehicle is likely to have not passed the check point. Thus, the controller 11 determines that the vehicle has not passed the check point if the distance from the target trajectory to the position of the vehicle is the predetermined value or longer. In this way, correction of the target trajectory is prohibited. It is therefore possible to prevent the target trajectory from being corrected based on wrong information (vehicle position that is not a base position).

The content of the present invention has been described above through an embodiment. However, it is obvious to those skilled in the art that the present invention is not limited to the description but various changes and modifications can be made.

REFERENCE SIGNS LIST 12a, 12b camera
23 learning unit (learning circuit)
31 travel control unit (travel control circuit)
CK1 to CK4 check point (point)
FP1 to FP4 feature point
TJ1 to TJ4 target trajectory

The invention claimed is:

1. A travel control method of a vehicle, comprising:
   learning points which the vehicle has traveled over based on images of surroundings of the vehicle captured with a camera mounted on the vehicle; and performing travel control of the vehicle such that the vehicle passes the learned points again, the performing travel control comprising:
- calculating and learning a vehicle odometry of the vehicle based on a rotational speed of each wheel obtained from a wheel speed sensor when learning the points;
- determining whether the vehicle has passed the points based on the images captured with the camera while performing the travel control;
- if the vehicle has passed any of the points, performing the travel control of the vehicle by using the vehicle odometry as a target trajectory from any of the points to a next point; and
- determining whether the vehicle has passed the next point based on the images captured with the camera.

2. The travel control method according to claim 1, wherein the vehicle odometry of the vehicle between the points is learned based on the vehicle signal obtained from the vehicle when the points are learned.

3. The travel control method according to claim 1, further comprising:
- when it is determined that the vehicle has passed any of the points, setting the vehicle odometry from any of the points to the next point as the target trajectory;
- correcting the target trajectory by using a position and a travel direction of the vehicle at a point when it is determined that the vehicle has passed any of the points; and
- prohibiting the correction of the set target trajectory when it is determined that the vehicle has not passed any of the points.

4. The travel control method according to claim 3, further comprising calculating a distance from the target trajectory to a position of the vehicle,
wherein it is determined that the vehicle has not passed any of the points if the distance is a predetermined value or longer.

5. The travel control method according to claim 1, further comprising:
- detecting a first movement value of the vehicle based on an image of the surroundings of the vehicle;
- detecting a second movement value of the vehicle based on the vehicle signal outputted from the vehicle;
- comparing the first movement value and the second movement value with each other; and
- correcting output values from the camera based on a result of the comparison.

6. The travel control method according to claim 5, wherein an output value in a travel direction of the vehicle and an output value in a direction perpendicular to the travel direction are corrected as the output values from the camera.

7. The travel control method according to claim 5, wherein the correction of the output values is executed while the vehicle is advancing straight.

8. A travel control device comprising:
a learning circuit configured to:
- learn points which a vehicle has traveled over based on images of surroundings of the vehicle captured with a camera mounted on the vehicle; and
- calculate and learn a vehicle odometry of the vehicle based on a rotational speed of each wheel obtained from a wheel speed sensor when learning the points; and a travel control circuit that performs travel control of the vehicle such that the vehicle passes the learned points again, the travel control circuit configured to:
- determine whether the vehicle has passed the points based on the images captured with the camera;
- if the vehicle has passed any of the points, perform the travel control by using the vehicle odometry as a target trajectory from any of the points to a next point; and
- determine whether the vehicle has passed the next point based on the images captured with the camera.

* * * * *